US006510282B1

(12) United States Patent
Ruck et al.

(10) Patent No.: US 6,510,282 B1
(45) Date of Patent: Jan. 21, 2003

(54) LONG-LIFE FOCAL PLANE SHUTTER FOR RECONNAISSANCE CAMERAS

(75) Inventors: Richard C. Ruck, Antioch, IL (US); John F. Milwee, Carpentersville, IL (US); James P. Quinn, Gurnee, IL (US); Alan Lubow, Cary, IL (US); Ralph Hernicz, Elk Grove Village, IL (US); George S. Chirempes, Lake Villa, IL (US)

(73) Assignee: Recon/Optical, Inc., Barrington, IL (US)

(*) Notice: Subject to any disclaimer, the term of this patent is extended or adjusted under 35 U.S.C. 154(b) by 0 days.

(21) Appl. No.: 09/976,401

(22) Filed: Oct. 11, 2001

(51) Int. Cl.$^7$ ............................................... G03B 39/00
(52) U.S. Cl. .......................... 396/8; 396/481; 348/144; 348/367
(58) Field of Search ................................. 396/479, 480, 396/481, 482, 7, 8; 348/144, 145, 146, 147, 362, 367

(56) References Cited

U.S. PATENT DOCUMENTS

| | | | |
|---|---|---|---|
| 2,713,814 A | | 7/1955 | Sonne et al. ................. 19/12.5 |
| 4,235,546 A | * | 11/1980 | Woodfine ..................... 396/482 |
| 4,505,559 A | * | 3/1985 | Prinz .............................. 396/8 |
| 4,664,494 A | | 5/1987 | Hughes et al. ........... 354/234.1 |
| 6,108,032 A | | 8/2000 | Hoagland ..................... 348/144 |
| 6,256,057 B1 | | 7/2001 | Mathews et al. ........... 348/144 |
| 6,336,752 B1 | | 1/2002 | Balopole et al. ............ 396/459 |

OTHER PUBLICATIONS

Air Force T.O. 10A1–5–29–2 Technical Manual, Service Instructions, Camera Set, Still Picture, Type KS–87B, Type KS–87D (May 19, 1989).

Navy Air Systems Command, Technical Manual, Operation and Intermediate Maintenance with Illustrated Parts Breakdown, KS–153A Still Picture Camera Set (Nov. 1, 1988).

CAI Brochures, "KS–87B Aerial Reconnaissance Camera" (Nov. 1978).

CAI Brochure, "KA–96A 24–inch FL Frame Camera" (circa 1980).

* cited by examiner

*Primary Examiner*—David M. Gray
(74) *Attorney, Agent, or Firm*—McDonnell Boehnen Hulbert & Berghoff (57) ABSTRACT

A shutter for reconnaissance cameras includes a digital signal processor (DSP) system which provides for control of motors moving two curtains. The curtains each define an edge, the gap between the edges of the curtains defines an exposure slit. The shutter replaces the prior art DC curtain motors and potentiometer curtain position sensing devices with AC motors having integral resolvers that provide motor shaft position feedback information. Furthermore, a mechanical clutch coupling the curtains together, which has been standard practice in the prior art, has been eliminated, with the precise movement of the curtains governed by the motors under control by the DSP. The marriage of DSP control with the AC motors and resolvers provides a direct coupling to the curtains, with built-in motor shaft position feedback via the resolvers. This design allows not only precise movement of the curtains and control of the exposure slit, but also provides for a dramatically increased durability, reliability, long mean time between failure, and high frame rates. The shutter is thus able to meet the requirements of the latest generation of reconnaissance cameras, whereas known prior at shutters lacked these capabilities due to their inherent design limitations.

8 Claims, 7 Drawing Sheets

LONG-LIFE FOCAL PLANE SHUTTER FOR RECONNAISSANCE CAMERAS

BACKGROUND OF THE INVENTION

A. Field of the Invention

This invention relates generally to the field of focal plane shutters found in cameras used for aerial reconnaissance, aerial surveying, mapping and other similar applications.

B. Description of Related Art

Focal plane shutters are known in the art. They are commonly found on aerial reconnaissance cameras, including cameras based on a film image-recording medium and cameras based on an electro-optical image recording medium, such as a charge-coupled device. The shutters typically use an opaque material known as a "curtain", or a pair of curtains between which a gap or space is formed. The curtain or curtains are selectively and controllably moved relative to a photosensitive image recording medium to thereby control the exposure of the medium to radiation from a scene of interest.

Prior art reconnaissance camera shutters developed in the early 1960's were mostly mechanical by design. The shutter was comprised of two adjacent curtains placed in the optical light path of the camera. Driven by a series of gears, cams, and cam followers, the curtains performed the shutter function by moving simultaneously, but slightly separated from each other, across the focal plane. The scene presented to the camera was exposed on film by rapidly moving the open 'slit' formed, by the separated curtains, across the film. The width of the slit was adjusted to determine the desired exposure.

One such shutter, manufactured by Recon/Optical, Inc., was known as the KS-87 shutter and found in many reconnaissance cameras of that era. It used what is called the 'window shade' principle. The shutter curtains were 'cocked' in the closed position, and held by an electromagnetic brake. When the exposure command was given, the brake was released and the shutter curtains traversed the optical opening of the focal plane exposing the film to the scene radiation similar to a window shade being unlocked and rolling upwards to the roller. The shutter was then re-cocked and the curtains drawn back to the start or closed position. An obvious disadvantage was that the shutter curtains had to be cocked and held by clutches before each shutter operation. The use of springs, gears, cams, and other mechanical complexities resulted in a low shutter cycle life expectancy, or MTBF (mean time between failure).

In the mid-1980's an improved shutter, referred to as the KS-147 shutter, was developed by Recon/Optical, Inc. The shutter is described in the patent to Hughes et al., U.S. Pat. No. 4,664,494, assigned to the Assignee of the present invention. The entire content of the Hughes et al. patent is incorporated by reference herein. Although the KS-147 shutter still used two curtains and an associated moving slit as the exposure method, the shutter operated on an entirely different principle from the older KS-87 shutter design. In particular, the curtain assembly was now moved across the focal plane at a controlled rate using a pair of motors, one for each curtain. The curtains were started and then stopped by the motors after the exposure was completed. No springs were necessary to "cock" and move the curtains. When the subsequent exposure command was given, the curtains were moved by the motors in the opposite direction across the optical opening and again brought to a stop. This technique is referred to as bi-directional shutter operation.

The KS-147 shutter was developed for five (5) inch film format reconnaissance cameras. The shutter curtains are driven at a speed of 100 inches per second by a set of timing belts using pulleys and D.C. brush type motors. The relative position of the two shutter curtains, with respect to each other, is maintained by using a curtain position sensing potentiometer coupled to the drive motor via a gearbox. To minimize variation during an exposure, the curtain drive belts are mechanically locked by an electromechanical clutch. This clutch is activated at the beginning of the exposure cycle and de-activated at the end of the exposure cycle to permit changes in exposure time if required due to changing light conditions. The relative curtain positioning, which determines the slit width and exposure, utilizes single turn potentiometers to sense curtain position. This positioning requires mechanical adjustment during the initial manufacture and calibration of the shutter.

The KS-147 shutter uses both analog and digital electronics technology. The shutter operating parameters such as curtain acceleration and deceleration are factory pre-programmed into an electronically programmable read only memory chip or EPROM. The EPROM signal is converted to an analog signal, which represents the shutter parameters, by a digital to analog converter (DAC). The output of the DAC is then summed with the output of the curtain position sensing potentiometers in the shutter. The combined signal is used to develop the D.C. voltage required to drive the D.C. torque motors and in turn the shutter curtains.

Although it was acceptable at the time of development, this type of design has several drawbacks. First, in order to change the system parameters, the EPROM must be removed and reprogrammed externally, or the EPROM must be replaced with one containing new parameters. Second, the brushes in the D.C. torque motors generate noise and are subject to wear. Third, the wiper used in the potentiometer is also subject to wear resulting in noise and subsequent poor shutter performance. The maximum cycle rate of the KS-147 shutter using this design is only 4 cycles per second with an average life cycle expectancy of only 200,000 cycles.

Both the KS-87 and KS-147 shutters were designed for five (5) inch format film reconnaissance cameras and, at the time, filled that requirement well. The number of shutter cycles required by the camera was modest and film was the preferred medium. However, with the advent of electro-optical (EO) cameras and the use of solid-state electronic imaging arrays in place of film, the need for a smaller EO format shutter with increased reliability over an increased number of cycles became necessary. As the demand for electro-optical cameras has increased, so has the need for a high cycle life, higher frame rate shutter.

The prior art shutters described above do not meet the described needs, thereby providing the impetus for the present invention. In particular, the art has needed a shutter which will operate at faster rates, for a longer life cycle and greater MTBF, and with a longer period of time between maintenance, exceeding the capability of the KS-147 shutter. In particular there is a demand for a compact, robust, long-life shutter capable of operating at 7½ frames per second for a life cycle of 1,000,000 cycles before refirbishment, and also for a shutter that will operate for up to 3 years before requiring maintenance. The present invention meets that need.

SUMMARY OF THE INVENTION

It has been found by the present inventors that the prior art shutters developed for reconnaissance cameras have inherent mechanical and electrical design limitations that prevent such a shutter design from meeting the life cycle, cycle rate and maintenance interval objectives required for high performance electro-optical reconnaissance cameras.

In particular, the present inventors have appreciated that the long-life, maintenance interval and cycle rates can be achieved by proving for digital signal processor (DSP) control of the motors moving the curtains, and by replacing the prior art DC motors and potentiometer curtain position sensing devices with AC motors having integral resolvers that provide motor shaft position feedback information. Furthermore, the mechanical clutch coupling the curtains together has been eliminated, with the precise movement of the curtains governed by the motors under control by the DSP. The marriage of DSP control with the AC motors and resolvers, providing direct coupling to the curtains and with built in resolver motor shaft position feedback, allows not only precise movement of the curtains and control of the exposure slit, but also provides durability, reliability, and low failure rates such that the shutter-meets the long-life, maintenance and frame rate requirements of current and next generation reconnaissance cameras.

Thus, in a first aspect we have invented an improvement to an electronic focal plane shutter having first and second curtains each having an edge, said edges defining an exposure slit for an image recording medium. The improvement comprises providing first and second motors having resolvers measuring the position of the shaft of the motors. The motors provide for movement of the first and second curtains. Additionally, the improvement includes a digital signal processor generating movement commands for the motors to effectuate movement of the curtains. The combination of the digital signal processor, motors and resolvers allows for precise movement of said first and second curtains and movement of the exposure slit over the image recording medium without requiring the use of a mechanical clutch to couple the first and second curtains, or analog potentiometers to sense the position of the curtains.

BRIEF DESCRIPTION OF THE DRAWINGS

A presently preferred embodiment of the invention is shown in the appended drawings, wherein like reference numerals refer to like elements in the various views, and wherein.

DETAILED DESCRIPTION OF A PREFERRED EMBODIMENT

Overview

A shutter is provided comprised of two adjacent curtains, each driven rapidly and simultaneously across the focal plane by separate motors via a series of timing belts and pulleys. The scene entering the optical path of the camera is exposed onto the EO imaging array by rapidly moving a slit, which is formed by providing a small separation between the two curtains, across the focal plane. The exposure is controlled by carefully adjusting the width of the slit by electronic means based on the required exposure. The shutter operation is bi-directional, meaning that the shutter curtains traverse first in one direction across the format area and then in the opposite direction on the next shutter cycle.

Although it is similar in several ways to the prior art KS-147 shutter, the shutter of the preferred embodiment described below contains many unique features not found in the prior art shutters. By employing a unique marriage of mechanical innovation and modem digital signal processing (DSP) technology, this new shutter design resolves many of the reliability problems and life cycle limitations associated with the prior art shutters, and increases the cycle or frame rate. In addition, the incorporation of DSP technology allows the exposure to be controlled electronically on a frame by frame basis to accommodate rapidly changing light and scene conditions. The shutter contour of operation is also field programmable. Furthermore, the shutter is capable of sensing potential curtain damage and has a self-calibrating feature.

In order to be more synergistic with the new EO cameras, the new shutter is designed to provide increased shutter cycle life and associated MTBF, and to achieve a higher frame rate. This was accomplished by eliminating several high wear, moving mechanical components found in the prior art, including the brush type DC motors, position sensing potentiometers, the gear train that couples the curtain position sensing potentiometer to the motor, and the electromechanical clutch. The gear train assembly is eliminated by through the use of a combination motor and resolver for each curtain. The resolver is a brushless type and replaces the potentiometer. It is coupled directly to a brushless AC motor to increase position-sensing accuracy. This combination of motor-resolver eliminates the increasing age-related wear and noise from the potentiometer wiper arm and the brushes in the motor, and results in increased shutter performance over the prior art.

Another key factor in achieving the desired performance improvement is the elimination of the clutch assembly, which in the prior art controlled the separation (slit width) of the two moving curtains. The clutch removal was made possible only by implementing software-based DSP technology in conjunction with the combination position-sensing resolvers and motors that independently drive each curtain. The curtain separation (slit width) and resulting camera exposure setting is now more accurately controlled through synchronous operation of the DSP controlled motors.

The DSP system as implemented in the shutter design contains a flash memory chip and a field programmable gate array (FPGA) to store and generate many of the parameters pertaining to the operational characteristics of the shutter. These parameters can be changed in the field thereby eliminating the need for the removing and re-programming of EPROM's at the factory, as was necessary with the prior art KS-147 shutter. An RS-232 serial communications port is provided on the shutter for connection to a laptop computer. Features that can be reprogrammed with the computer in the field include the calibration of the exposure loop or slit width, the curtain velocity, and the shutter cycle rate. The cycle rate can be adjusted without a complete camera system for test purposes. The electronic exposure time can also be read out by the computer without the need for additional test equipment. The later feature also eliminates the need for manual calibration of the curtain position sensors, as necessary in the prior art.

In one possible embodiment, the shutter also contains circuitry that monitors the operation of the shutter curtains and automatically shuts down the shutter should the shutter curtains become de-synchronized, or exceed the programmed velocity of 100 inches/second. Upon re-start, the shutter goes through a self-calibration mode re-establishing the curtain positions with respect to each other. During a shutter cycle, the camera monitors the current drain of each motor and reports that-data via the RS-232 host communication line.

The predicted shutter life for the illustrated embodiment is 1,000,000 cycles of operation at 4.0 frames/second with an MTBF of 3 years. This is a very substantial improvement over prior art shutter designs. The high cycle life shutter of the illustrated embodiment is designed for a 70 mm format focal plane and although primarily for use with electro-optical (EO) cameras, the shutter can also be used with small format film cameras. The shutter operates over an exposure range from 1/1500 second to 1/50 second, is bi-directional, and capable of operating repeatedly at cycle rates up to 7.5 cycles/second. Obviously, the size of the format area is not particularly important, as the shutter can be scaled up for use in larger format reconnaissance cameras such as the five inch KS-87, KS-147, KS-146 etc. for application in either film or larger format electro-optical detectors. Conversely, the shutter can be scaled down to smaller formats. In either case, the DSP system and mechanical design will be applicable to larger and smaller scale implementations than the 70 mm format focal plane in the illustrated embodiment.

Mechanical Description

Figure 1:
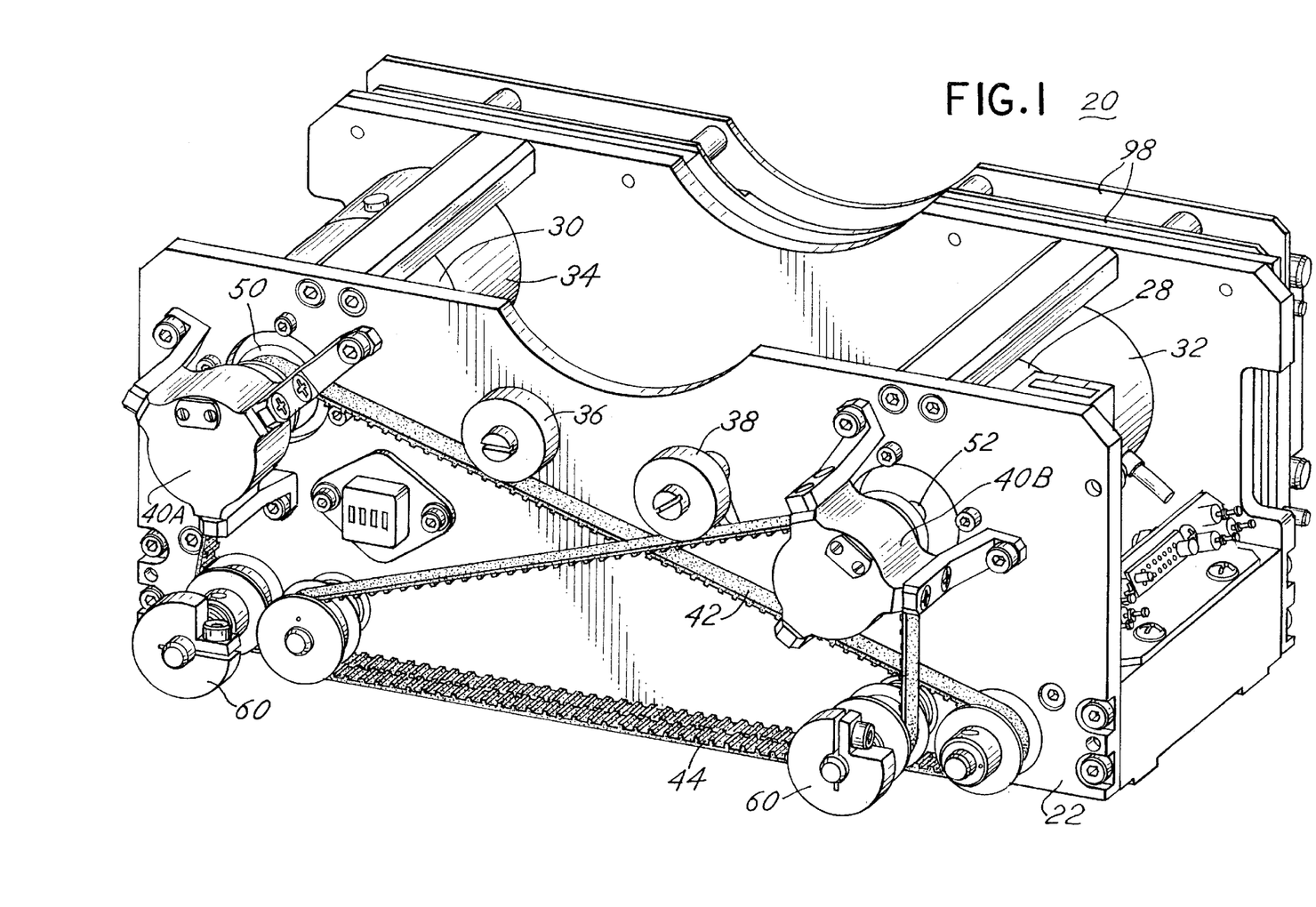
FIG. 1 is a perspective view of a shutter in accordance with a preferred embodiment of the invention.
Figure 2:
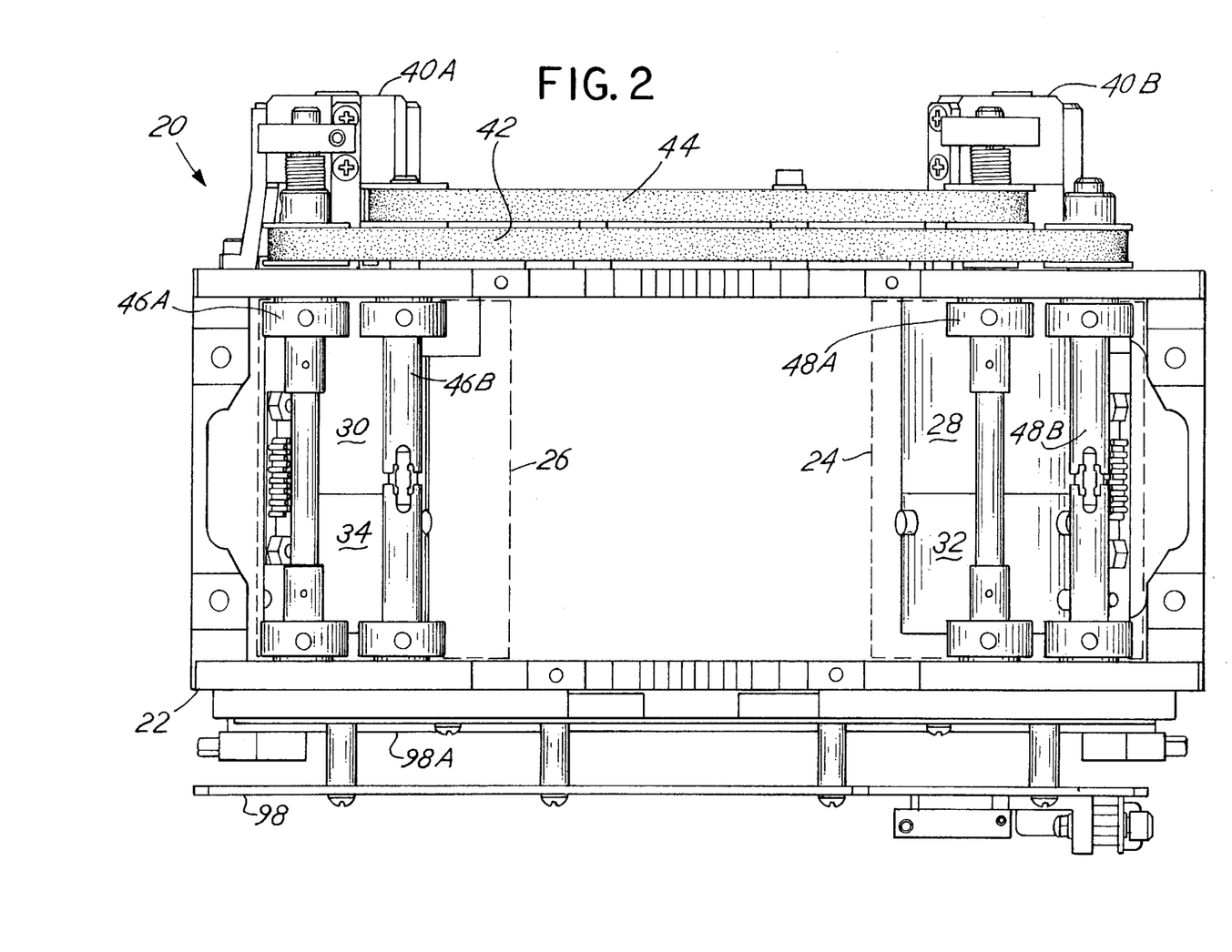
FIG. 2 is a top plan view of the shutter of FIG. 1.
Figure 3:
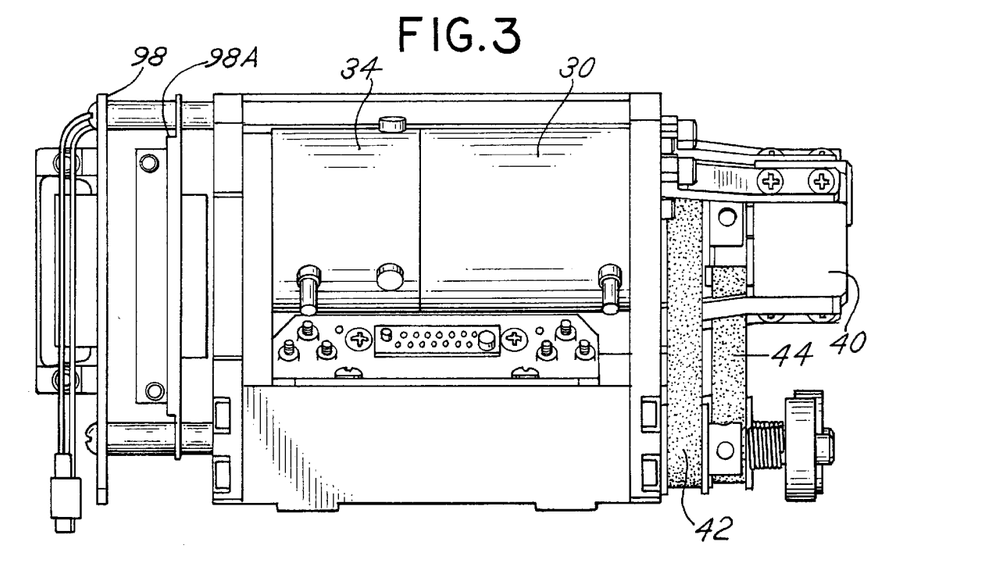
FIG. 3 is an end view of the shutter of FIG. 1.
Figure 4:
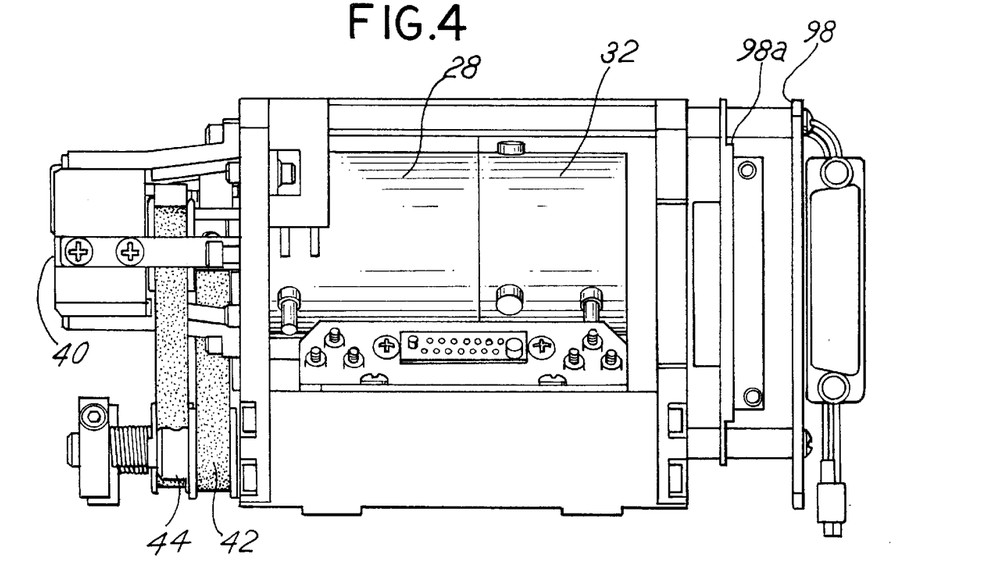
FIG. 4 is an opposite end view of the shutter of FIG. 1.
Figure 5:
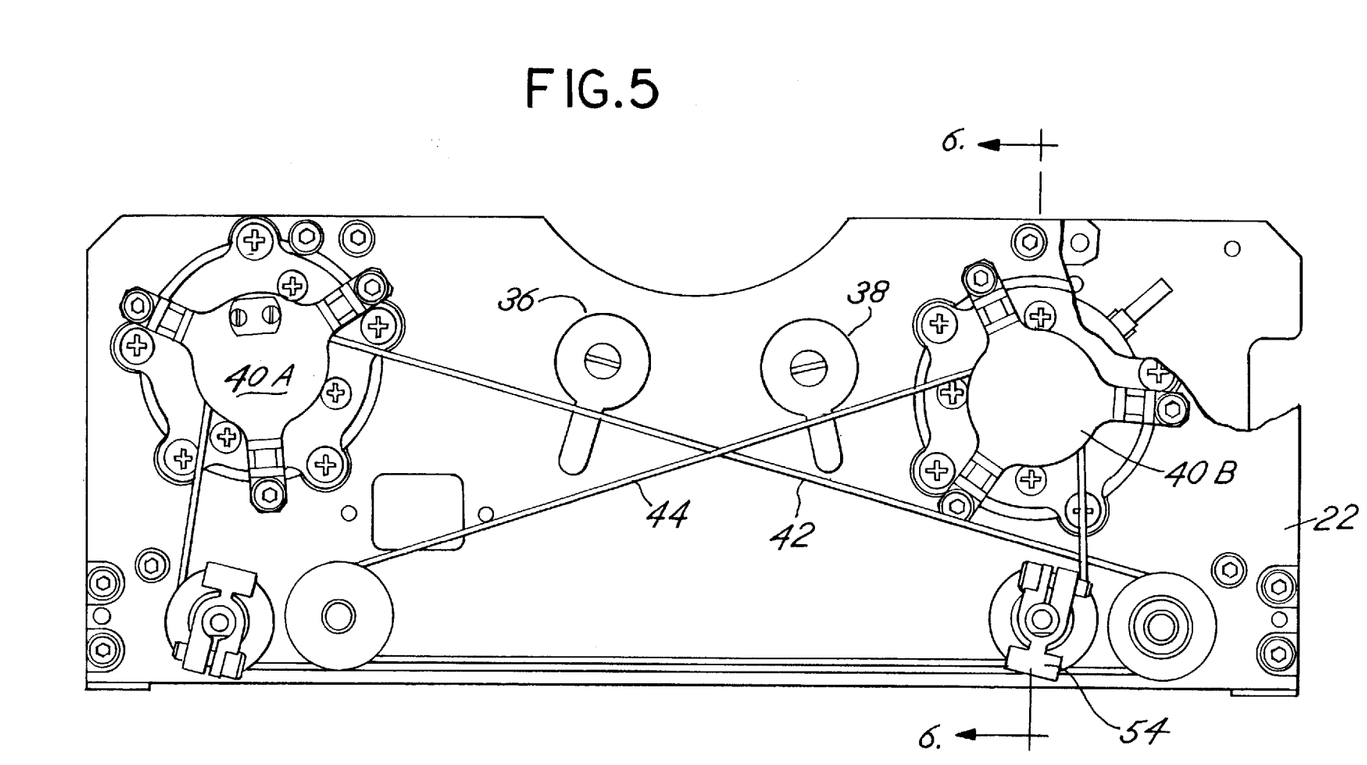
FIG. 5 is a side view of the shutter of FIG. 1; showing the motors and drive belts that move the two curtains of the shutter.
Figure 6:
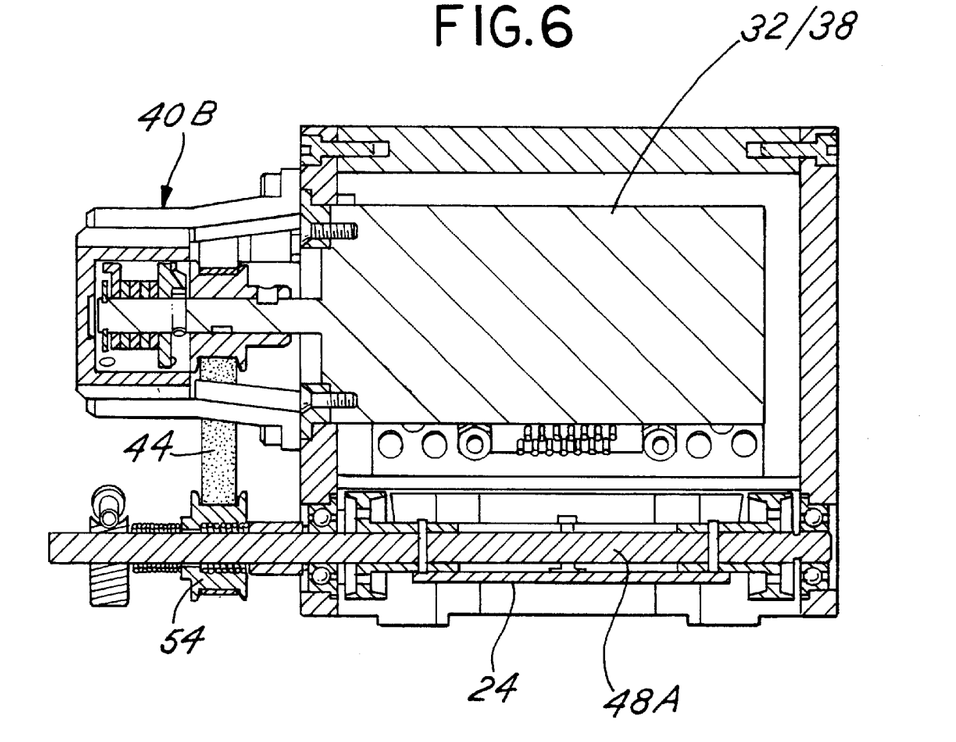
FIG. 6 is a cross-section of the shutter of FIG. 1 taken along the lines 6—6 of FIG. 5.

Referring now to FIGS. 1–6, the shutter 20 in accordance with a representative embodiment of the invention includes a frame 22 and a pair of curtains 24 and 26, which are shown in dashed lines in FIG. 2 in order to better illustrate the rest of the structure of the shutter. The curtain 24 is coupled to a pair of roller assemblies 48A and 46B. The curtain 26 is coupled to a pair of roller assemblies 46A and 48B. The shutter further includes a first AC motor 28 and integral brushless resolver 32 for the first curtain 24 and a second AC motor 30 and integral brushless resolver 34 for the second curtain 26. The motor 28 rotates a timing pulley 52 causing a timing or drive belt 44 attached to the shaft of the roller assembly 48A to move the curtain 24 back and forth. Similarly, the motor 30 rotates a timing pulley 50 causing a timing belt 42 attached to the shaft of the roller assembly 46A to independently move the curtain 26 back and forth.

The shutter also includes electronics boards 98 and 98A mounted adjacent to the frame 22 which houses the electronic circuitry for the shutter. The electronic circuitry is explained in the block diagram of FIG. 7 below.

The shutter weighs less than 7.0 pounds in the illustrated embodiment. All mechanical components are designed to operate in environments −20° F. to 160° F., high humidity and atmospheric pressures up to 60,000 feet.

The shutter frame 22 is designed to be compact yet accommodate the 70 mm EO format area. The frame 22 is ruggedly designed for use in aircraft environments precisely constructed to allow accurate curtain alignment and fabricated from a common aluminum alloy to give long life and repeatable assembly and disassembly. The design allows easy access components for replacement without removing a module.

The two drive motors 28 and 30 are mounted to be accessible outside the frame 22. They independently drive the two curtains 24 and 26 across the format area by using a simple timing belt/pulley system. The system is designed to control each curtain 24, 26 independently and provide long wear life and durability. The belt/pulley system is designed to not impose any excess torque to the curtain rollers should a motor develop an uncontrolled runaway condition.

The two shutter curtains 24, 26 are made of titanium in the illustrated embodiment and designed for long life, stability, high-speed operation, and durability. Weight is kept to a minimum for maximum motor performance. A special flat black paint mixture is used to coat each curtain to prevent light reflections back into the camera.

The roller assemblies 46A and 48A that mount the curtains 24 and 26 are rigid and designed for keeping the two curtains aligned to the image format even at high shutter speeds. Rollers 46B and 48B contain a differential pivot between two mounting discs to which the curtain legs of the curtains are attached to equalize the tension load on each curtain. Each curtain has a spring 60 that is carefully tensioned by the belt/pulley system. This tension is effective but minimized to allow a long curtain life. Adjustable belt tensioners 36, 38 are provided to adjust the tension on the belts 42, 44, respectively.

Each motor has a rotation stop assembly 40A, 40B in order to provide initialization for resolver positioning. The stop assemblies 40A, 40B also limit the number of revolutions the motor could impose on the curtains in order to prevent the curtains from tearing from their mounting points.

Additional mechanical details of the shutter are not important and can be readily derived or ascertained from the drawings by persons skilled in the art. Such mechanical details can vary considerably from the illustrated embodiment without departure from the scope of the invention.

Digital Signal Processor (DSP) System Description

Figure 7:
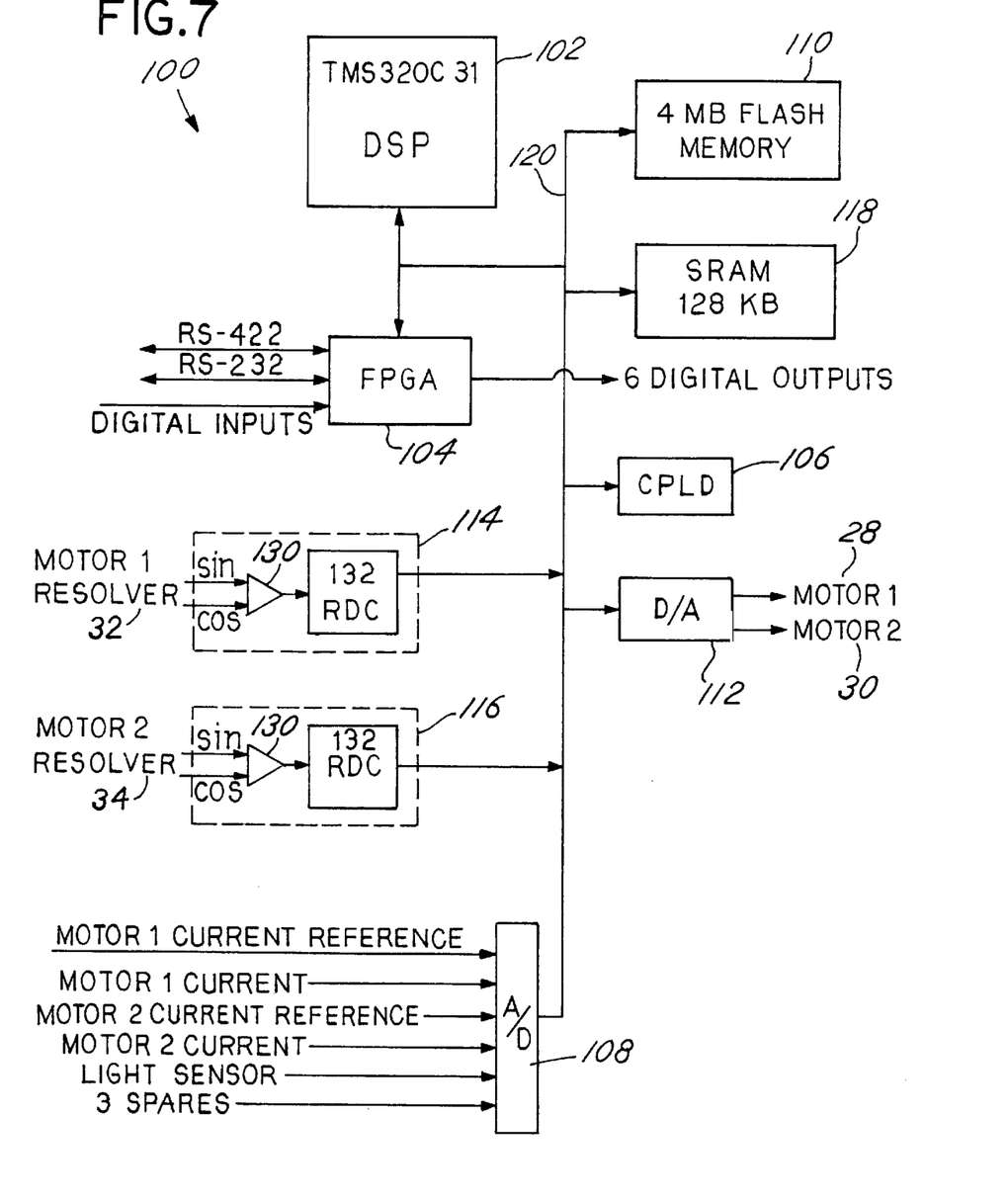
FIG. 7 is a block diagram of the DSP electronic control system for the shutter of FIG. 1.

The shutter of FIGS. 1–6 includes a DSP feedback control system 100 shown in block diagram form in FIG. 7. The Digital Signal Processing System (DSP) feedback control system 100 consists of the following major components: a TMS320C31 Digital Signal Processor (DSP) 102, a Field Programmable Gate Array (FPGA) 104, Complex Programmable Logic Device (CPLD) 106, an Analog-to-Digital Converter (ADC) 108, a Flash memory chip 110, a Digital-to Analog converter (DAC) 112, Two Resolver-to-Digital Converter (RDC) modules 114 and 116, and Static Random Access Memory (SRAM) chips 118. The components are connected to each other by a high-speed digital bus system 120.

The primary job of the DSP system 100 is to function as a programmable digital controller to accurately control the operation of the high life cycle shutter 20 of FIG. 1. The DSP system 100 replaces all operational amplifiers, resistors, capacitors, FET switches, and potentiometers found in the prior art KS-147 shutter with a numeric processor, memory, analog-to-digital converters and digital-to-analog converters.

The compensation transfer function for the shutter is implemented in software as digital filters with the coefficients stored in memory. By maintaining high data resolution and high signal dynamic range, the performance of traditional analog compensator systems, such as found in the Hughes et al. patent cited earlier, is exceeded. High resolution is provided in the ADC, the DAC, and the data word length as represented inside the numeric processor. The precision of the floating point of data representation is maintained as the data is filtered through the compensators without the need for scaling factors. This also makes software development much easier. The transfer function is also represented more precisely by use of the floating-point representation. The floating-point digital signal processor has a 32-bit word length of which the mantissa is 24 bits. This implies 7 decimal digit resolution on all parameters, or 0.00001%. The sample time, another critical aspect of the control system, has been selected so the amount of phase shift caused by the sampling process is negligible in the frequency band of interest.

Field Programmable Gate Array (FPGA) 104:

The primary functions of the FPGA 104 are to give DSP 102 access to control the ADC data interface 108, provide the DSP 102 with the access to resolvers for the motors, provide for RS-232/RS-422 communication serial data interface through a UART interface implemented inside the FPGA 104, and obtain additional digital inputs.

Complex Programmable Logic Device (CPLD) 106:

The primary functions of the CPLD 106 are to generate chip selects for DSP peripheral devices, wait-state generation, and interrupt control. The CPLD is vital since it is able to execute at high speeds.

Flash Memory 110:

The flash memory 116 is organized as 524,288 Kbytes of 8 bits each. The flash memory 110 is important since it boots the DSP system 100 and allows rapid, in-circuit programming for all application software programs from an external source.

Analog to Digital Converter (ADC) 108:

The ADC 108 has 12-bit resolution and 8 analog input channels. It is used to convert the analog inputs from the motors (motor current reference and motor current) and a exposure control light sensor analog signal to digital inputs so that the DSP 102 can process them.

Digital to Analog Converter (DAC) 112:

The DAC 112 changes digital signals for the motors into analog signals. The DAC chip has four separate 12-bit voltage outputs that provide current reference signals to the power amplifiers (not shown) which drive the shutter motors 28 and 30.

Resolver to Digital Converter (RDC) modules 114 and 116:

The resolvers 32 and 34 are motor shaft position sensors, which provide an accurate measurement of the curtain positions which allow a given exposure to be achieved. Since the resolvers turn multiple resolutions they must be homed at power up. The resolvers 32 and 34 provide sin and cosine analog position signals to an amplifier 130. An analog to digital converter 132 converts the amplified analog position signal to a digital representation for use by the DSP 102. The resolvers 32 and 34 are brushless devices coupled to the back of each motor. The resolvers measure the position of the shaft of the motor. Since the motors 28, 30 are coupled to the curtains 24, 26 via the drive belts 42 and 44 (see FIGS. 1 and 2), the resolvers 32, 34 accurately and independently determine the position of each of the two curtains.

Static Random Access Memory (SRAM) 118:

The (SRAM) provides the program and data memory for execution by the DSP 102.

Operation

Figure 8:
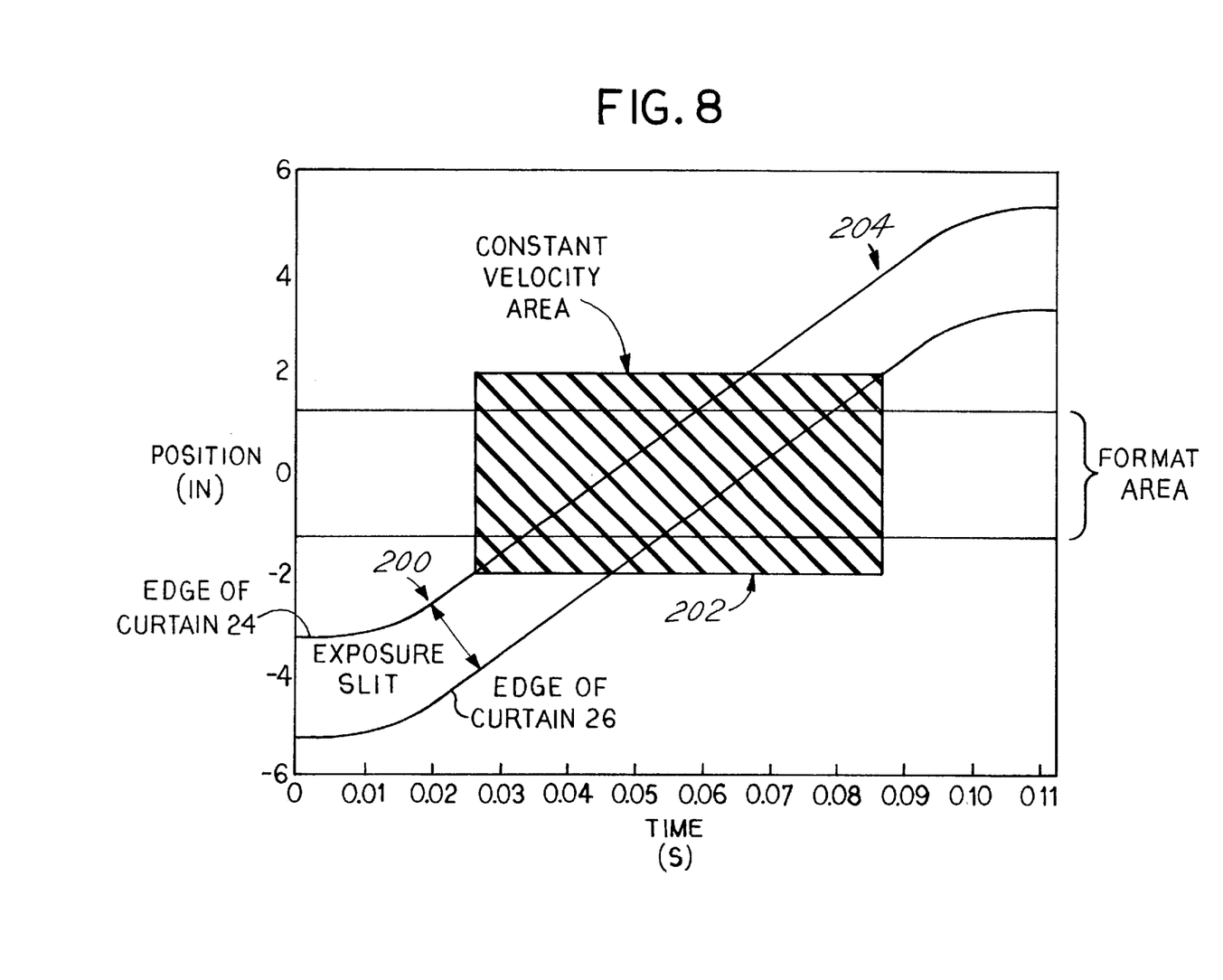
FIG. 8 is an illustration of the position of the curtains of the shutter as a function of time for a cycle of operation of the shutter. The top curve shows the position of the leading edge as a function of time and the lower curve shows the position of the trailing edge on the second curtain. The gap between the two curves represents the exposure slit between the curtains. The slit is held constant across the format area during the exposure in the illustrated embodiment.

Referring to FIGS. 1, 2 and 7, the smooth motion of the curtains is achieved by monitoring the resolver 32, 34 outputs through resolver-to-digital converters (RDC) modules 114 and 116 and summing these outputs with motor current flow reference signals digitized by an analog to digital converter (ADC) 108 to make an effective position control system. The DSP program software is stored in the flash memory 110, and executed by the DSP processor 102 in conjunction with the SRAM 118 to control the curtains 24 and 26. Pulse width modulation (PWM) signals generated by the DSP software and FPGA 104 are outputted from a digital to analog converter (DAC) 112 to drive the each motor 28, 30 and shutter curtain 24, 26 independently. The current supplied to the shutter motors 28, 30 controls the acceleration, deceleration and stopping of the shutter curtains as programmed in accordance with the shutter contour profile of FIG. 8.

The camera shutter is able to perform very efficiently because of the digital processing software program that is executed by the DSP system hardware. Again referring to the block diagram in FIG. 7, at power up or reset the FPGA 104 is configured, allowing the DSP system 100 to boot from the Flash memory EPROM 110. The shutter operation software program is then loaded into the Static Random Access Memory (SRAM) 118 for execution by the DSP processor chip 102. The system initializes and conditions the I/O signals as needed to perform the shutter operations. Digital signals from the ADC at 108 are inputted to the FPGA 104 while analog signals such as motor currents, current references, and light sensor data are received and converted to digital signals before being sent to the DSP processor 102 for processing.

When the shutter command is given, the software commands the DSP 102 to calculate a sine-squared function signal to start the curtain movement according to the programmed shutter contour profile parameters. These signals enable the motors, using pulse-width-modulation (PWM) technology, to drive the curtains to the prescribed contour. As indicated in the representative contour profile of FIG. 8, the curtains accelerate to a velocity of 100 inches per second in the initial time period 200, maintain the 100 inches per second velocity across the exposure format area during the time period 202, and then decelerate to a stopping point at the other end of the curtain travel during time period 204. During the deceleration portion of the cycle at 204, the output of an exposure control camera light sensor (not shown) is read and inputted to the ADC of FIG. 7 as shown in FIG. 7. The slit width between the curtains is adjusted by the DSP system 100 to control the exposure. The exposure control accommodates changing light conditions of the scene viewed by the camera. The acceleration and deceleration profiles 200 and 204 are designed to put minimum stress on the shutter mechanism and curtains yet achieve a cycle period that enables the shutter to cycle at rates of up to 7.5 cycles per second.

Upon start up or after a shut-down condition, the shutter performs an accurate initial calibration of shutter curtain positions by means of the feedback signals from the resolvers indicating motor shaft and hence curtain position.

At the end of a cycle of operation the DSP obtains signals from the light sensor via the A/D converter of FIG. 7 and determines whether the exposure slit size should be adjusted based on scene illumination. If so, the shutter width is automatically changed. In the next cycle of the shutter, the new slit width is observed. Therefore, the camera possesses the ability to change the shutter exposure width after every frame. In contrast, prior art shutters typically averaged exposure levels from multiple exposures and did not have the ability to change the slit width for every exposure.

As mentioned above, the FPGA 104 of FIG. 7 with external access to a technician's computer via the RS-232 interface allows the shutter to be programmable in the field. This is a major advantage over prior art shutters, which required the removal and reprogramming of a EPROM chip. Additionally, the programming of the shutter can be done on the shutter alone, and does not require the entire camera assembly to be physically attached to or with the shutter. Thus, contour profile, frame rate, cycle rate and other shutter parameters can be easily and simply programmed in the field. Or, alternatively, the shutter can be removed from the camera and these parameters set or reprogrammed in the shop via the RS-232 interface.

Additionally, the DSP system 100 detects the velocity of the shutter via the resolver signals from the A/D converter. The DSP system can thus detect whether the speed of the shutter curtains exceeds a preset limit, such as for example 100 inches per second. Exceeding such a velocity may damage very expensive items such as the curtains. Thus the DSP system can be programmed to shut down the curtain motors or otherwise govern their operation in the event of a runaway condition or other malfunction, thereby preventing further damage to the shutter.

Thus, it will be appreciated that we have described a new electronic focal plane shutter providing for a novel marriage of mechanical design innovation and digital signal processing technology. The shutter is capable of operating at a high frame rate of 7.5 cycles/second with a long cycle life of typically 1,000,000 cycles and an MTBF of 3 years. This operational design far exceeds the shutter designs of the prior art.

The shutter of the present invention can be used in a variety of types of cameras, including film or electro-optical cameras. One example is an electro-optical cameras having a square or rectangular format or detector area with 4 million, 25 million or perhaps 80 million individual pixel elements. The precise control of the shutter slit makes the subject shutter also well suited for cameras in which precise shutter motion is helpful for achieving forward motion compensation electronically, such as described in the patents of Hoagland, U.S. Pat. No. 6,108,032 or Mathews et al., U.S. Pat. No. 6,256,057.

The details of the shutter, such as the coupling of the curtains to the roller assemblies, the curtain construction, and various other mechanical details and details on the DSP control system are not considered especially important or critical to the invention. Such details are disclosed for the purposes of illustration of a presently preferred embodiment, and are not intended to be limiting of the scope of the invention.

We claim:

1. In an electronic focal plane shutter having first and second curtains each having an edge, said edges defining an exposure slit for an image recording medium, the improvement comprising:
   providing first and second motors having resolvers measuring the position of the shaft of said motors, said motors providing for movement of said first and second curtains,
   providing a digital signal processor system generating movement commands for said motors to effectuate movement of said curtains,
   wherein the combination of the digital signal processor, motors and resolvers allows for precise movement of said first and second curtains and movement of said exposure slit over said image recording medium without requiring the use of a mechanical clutch to couple the first and second curtains or analog potentiometers to sense the position of said curtains.

2. The improvement of claim 1, wherein said image recording medium comprises an electro-optical image recording medium.

3. A shutter for a reconnaissance camera, comprising:
   a first curtain having a first edge and a second curtain having an second edge, said first and second edges defining an exposure slit therebetween;
   a first motor for driving said first curtain and a second motor driving said second curtain;
   said first and second motors each motor associated with a resolver measuring the rotation of said first and second motors, respectively, and thereby the position of said first and second edges of said curtain; and
   a digital signal processor system generating movement commands for said first and second motors;
   wherein the position of the curtains is controlled by said motors and resolvers under control of said digital signal processor, and wherein said shutter further does not require a mechanical clutch to couple the first and second curtains thereby improving the life-cycle and reliability of said shutter.

4. The shutter of claim 3, wherein said shutter further comprises a field programmable gate array permitting field programming of said shutter.

5. The shutter of claim 3, wherein said magnitude of the exposure slit is changeable after every cycle of said shutter.

6. The shutter of claim 3 wherein said digital signal processor detects impending shutter curtain damage and responsively shuts down said shutter.

7. The shutter of claim 3 wherein said digital signal processor system detects the speed of said curtains and shuts down said shutter when said curtains exceed a predetermined limit in a run away condition.

8. The shutter of claim 3, wherein said shutter performs an initial self-calibration of said curtains upon power up or after a shut-down.

* * * * *